United States Patent
Be'Ery et al.

(10) Patent No.: US 11,616,854 B1
(45) Date of Patent: Mar. 28, 2023

(54) SYSTEM AND METHOD OF SECURED INTERFACE TO A BLOCKCHAIN BASED NETWORK

(71) Applicant: ZENGO LTD., Tel Aviv (IL)

(72) Inventors: Tal Arieh Be'Ery, Petah Tikva (IL); Menahem Cherbakovsky, Rehovot (IL)

(73) Assignee: ZENGO LTD., Tel Aviv (IL)

( * ) Notice: Subject to any disclaimer, the term of this patent is extended or adjusted under 35 U.S.C. 154(b) by 0 days.

(21) Appl. No.: 17/864,803

(22) Filed: Jul. 14, 2022

(51) Int. Cl.
*H04L 67/563* (2022.01)
*H04L 67/133* (2022.01)
*G06Q 20/38* (2012.01)

(52) U.S. Cl.
CPC ......... *H04L 67/563* (2022.05); *G06Q 20/389* (2013.01); *H04L 67/133* (2022.05)

(58) Field of Classification Search
CPC .... H04L 67/563; H04L 67/133; G06Q 20/389
See application file for complete search history.

(56) References Cited

U.S. PATENT DOCUMENTS

| | | | |
|---|---|---|---|
| 10,491,414 B1* | 11/2019 | Weed | H04L 63/20 |
| 10,958,662 B1* | 3/2021 | Sole | H04L 63/0853 |
| 2016/0371508 A1* | 12/2016 | Mccorkendale | H04L 63/0421 |
| 2018/0068097 A1* | 3/2018 | Collin | H04L 63/0892 |
| 2019/0379642 A1* | 12/2019 | Simons | H04L 63/0414 |
| 2020/0076918 A1* | 3/2020 | Chen | H04L 9/50 |

* cited by examiner

*Primary Examiner* — Harris C Wang
(74) *Attorney, Agent, or Firm* — Pearl Cohen Zedek Latzer Baratz LLP

(57) ABSTRACT

Systems and methods of securing interface to a blockchain based network, including generating, by a server, a proxy communication layer for communication between the server and a computerized device, wherein the proxy communication layer replaces an IP address of the computerized device with another IP address, intercepting, by the server, data communicated through the proxy communication layer, and blocking, by the server, unauthorized communication data intercepted by the server, wherein communication requests associated with unauthorized IP addresses are blocked, where the server is in communication with the blockchain based network, and wherein the server provides a web interface to decentralized applications of the blockchain based network.

15 Claims, 4 Drawing Sheets

```
┌─────────────────────────────────────────────────┐
│  Generating, by a server, a proxy communication │
│ layer for communication between the server and a│
│     computerized device, wherein the proxy      │
│  communication layer replaces an IP address of  │
│   the computerized device with another IP address│
└─────────────────────────────────────────────────┘
                        ↓ 301

┌─────────────────────────────────────────────────┐
│  Intercepting, by the server, data communicated │
│        through the proxy communication layer    │
└─────────────────────────────────────────────────┘
                        ↓ 302

┌─────────────────────────────────────────────────┐
│     Blocking, by the server, unauthorized       │
│  communication data intercepted by the server   │
└─────────────────────────────────────────────────┘
                         303
```

FIG. 3

SYSTEM AND METHOD OF SECURED INTERFACE TO A BLOCKCHAIN BASED NETWORK

FIELD OF THE INVENTION

The present invention relates to distributed ledger technologies (DLTs). More particularly, the present invention relates to systems and methods for secured interface to blockchain based networks.

BACKGROUND OF THE INVENTION

In recent years, new iterations or architectures of the World Wide Web were proposed. The WEB3 architecture proposes a new iteration of the World Wide Web based on a blockchain network, that incorporates concepts including decentralization and token-based economics.

The WEB3 architecture may allow users access to decentralized applications. For example, a dedicated web3 interface may allow web access using a dedicated browser (e.g., mobile or desktop) such that smart contracts of a blockchain based network are activated. Therefore, it can be desirable to secure the WEB3 architecture.

Currently, decentralized applications are used in blockchain based networks. A decentralized application (sometimes referred to as "dapp" or "Dapp") is an application that operates autonomously, for instance through the use of smart contracts, that runs on a decentralized computing, or blockchain based system. Dapps may provide some function or utility to its users, while operating without human intervention.

For example, when the user performs an action (e.g., buy an item in a game) this interface needs to suggest the relevant blockchain transactions and transmits them to the user's wallet. On the wallet, the user may review and confirm the transactions and then may signs and sends them to the blockchain for execution. Currently, connection of a Dapp to a (mobile) wallet may be carried out via a Wallet-Connect™ protocol, that may be coupled the user's computing device (e.g., a smartphone) directly through a web-socket to a dedicated bridge connecting the Dapp and the wallet.

Dapps may distribute tokens that represent ownership, according to a programmed algorithm to the users of the system, diluting ownership and control of the Dapp. Without any one entity controlling the system, the application becomes decentralized.

The transactions themselves can be mostly considered as a Remote Procedure Call (RPC). The RPC format details which function is to be executed by the blockchain, by specifying the target smart contract, the relevant function within it and its parameters, serialized as a binary buffer. This buffer may be sent to the blockchain, may be executed by the blockchain and finally the execution results may be stored within the blockchain.

SUMMARY OF THE INVENTION

There is thus provided, in accordance with some embodiments of the invention, a method of securing interface to a blockchain based network, including: generating, by a server, a proxy communication layer for communication between the server and a computerized device, where the proxy communication layer replaces an IP address of the computerized device with another IP address, intercepting, by the server, data communicated through the proxy communication layer, and blocking, by the server, unauthorized communication data intercepted by the server, where communication requests associated with unauthorized IP addresses are blocked. In some embodiments, the server is in communication with the blockchain based network, and where the server provides a web interface to decentralized applications of the blockchain based network.

In some embodiments, the unauthorized communication data is determined based on at least one of: protocol syntactic validity and rate of message sending. In some embodiments, the communication data is parsed according to a predetermined smart-contract at the blockchain based network. In some embodiments, the blocking of unauthorized communication is carried out by comparison to blacklists, whitelists, custom logic, and the web context through the lifecycle of the session.

In some embodiments, communication between the server and the computerized device is via a web-socket and based on a protocol for secure communication between wallets and decentralized applications. In some embodiments, communication between the server and the computerized device is based on a predetermined smart-contract at the blockchain based network.

In some embodiments, communication is maintained when the computerized device is offline by: saving communication data at the proxy communication layer, and transferring the saved data to the computerized device, when the computerized device is back online.

There is thus provided, in accordance with some embodiments of the invention, a system for secured interface to a blockchain based network, including: a web interface to decentralized applications of the blockchain based network, and a server, in communication with the blockchain based network and the web interface, where the server is configured to: generate a proxy communication layer for communication between the server and a computerized device, where the proxy communication layer replaces an IP address of the computerized device with another IP address, intercept data communicated through the proxy communication layer, and block unauthorized communication data intercepted by the server.

In some embodiments, the unauthorized communication data is determined based on at least one of: protocol syntactic validity and rate of message sending. In some embodiments, the communication data is parsed according to a predetermined smart-contract at the blockchain based network. In some embodiments, unauthorized communication is blocked by comparison to blacklists, whitelists, custom logic, and the web context through the lifecycle of the session.

In some embodiments, communication between the server and the computerized device is via a web-socket and based on a protocol for secure communication between wallets and decentralized applications. In some embodiments, communication between the server and the computerized device is based on a predetermined smart-contract at the blockchain based network.

In some embodiments, the server is configured to maintain communication when the computerized device is offline by: saving communication data at the proxy communication layer, and transferring the saved data to the computerized device, when the computerized device is back online.

There is thus provided, in accordance with some embodiments of the invention, a method of securing interface to a blockchain based network, including: replacing, by a server in communication with the blockchain based network, an IP address of the computerized device with another IP address, intercepting, by the server, data communicated between the server and a computerized device, and blocking, by the server, unauthorized communication data intercepted by the server. In some embodiments, the server provides a web interface to decentralized applications of the blockchain based network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 3 shows a flowchart of a method of, according to some embodiments of the invention.

Figure 1:
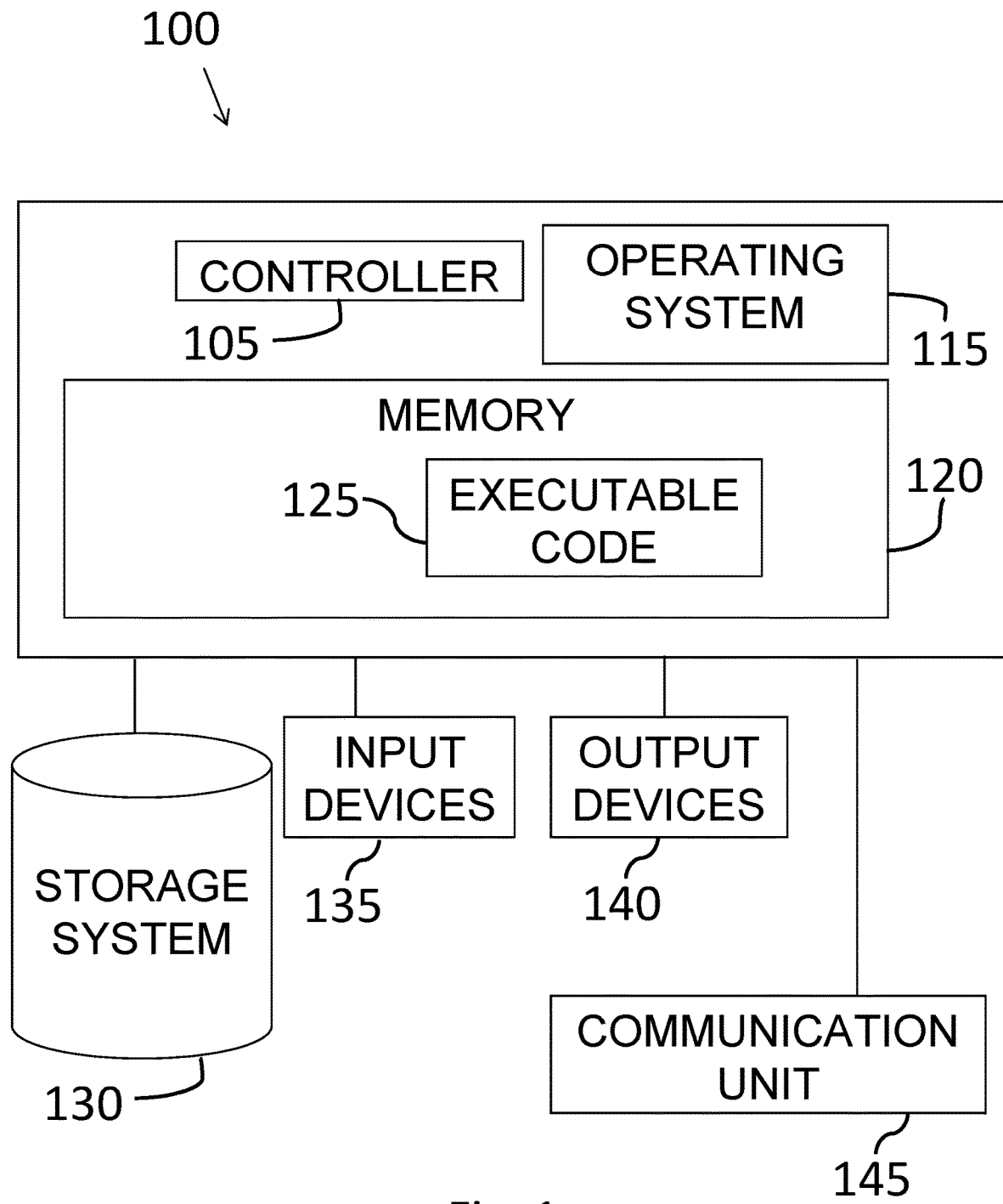
FIG. 1 shows a block diagram of a computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof may occur or be performed simultaneously, at the same point in time, or concurrently.

Reference is made to FIG. 1, which is a block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet.

Controller 105 may be configured to execute program code to perform operations described herein. The system described herein may include one or more computing device(s) 100, for example, to act as the various devices or the components shown in FIG. 2. For example, communication system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 are omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein.

The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components.

In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2A:
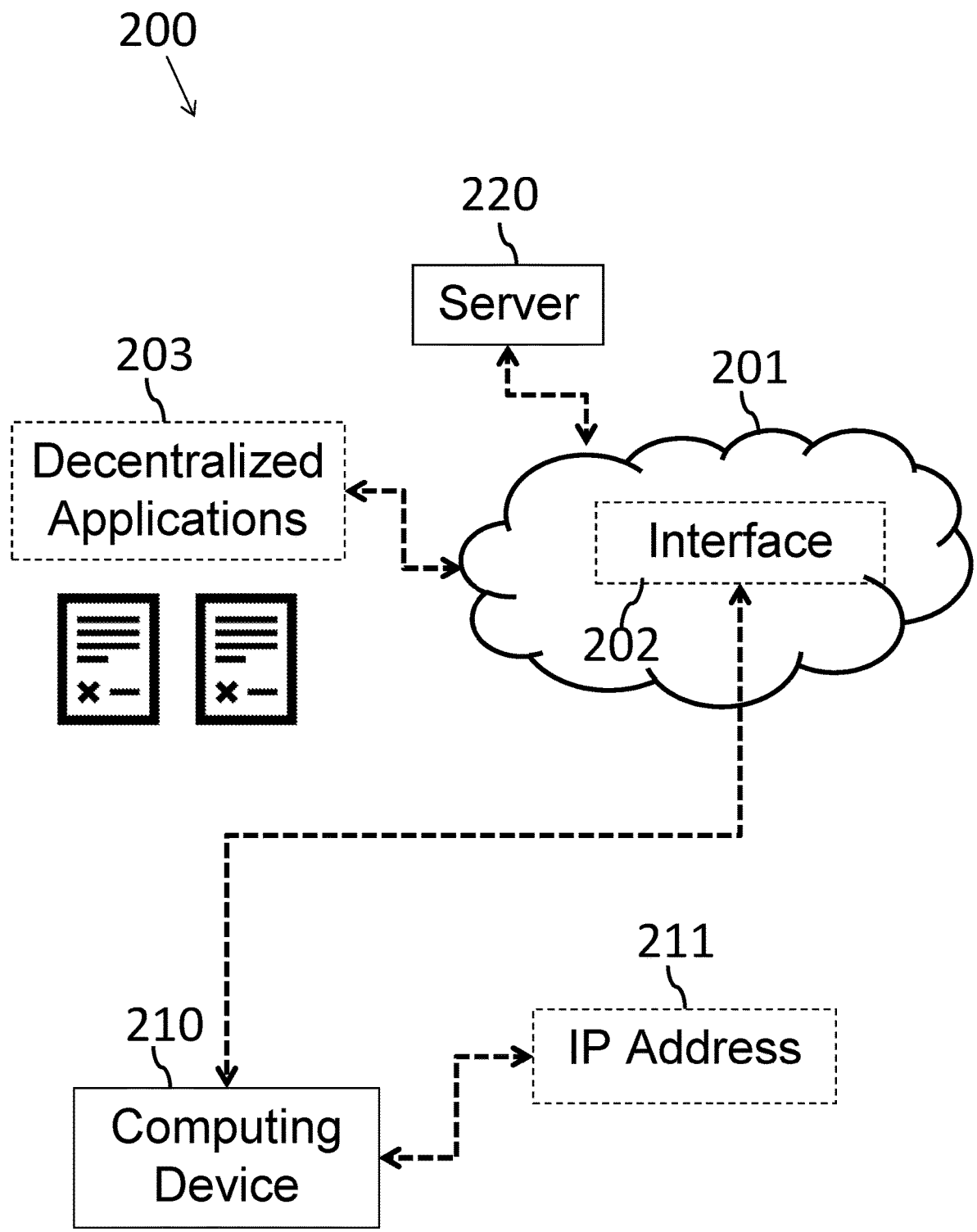
FIGS. 2A-2B shows a block diagram of a system for secured interface to a blockchain based network, according to some embodiments of the invention.
Figure 2B:
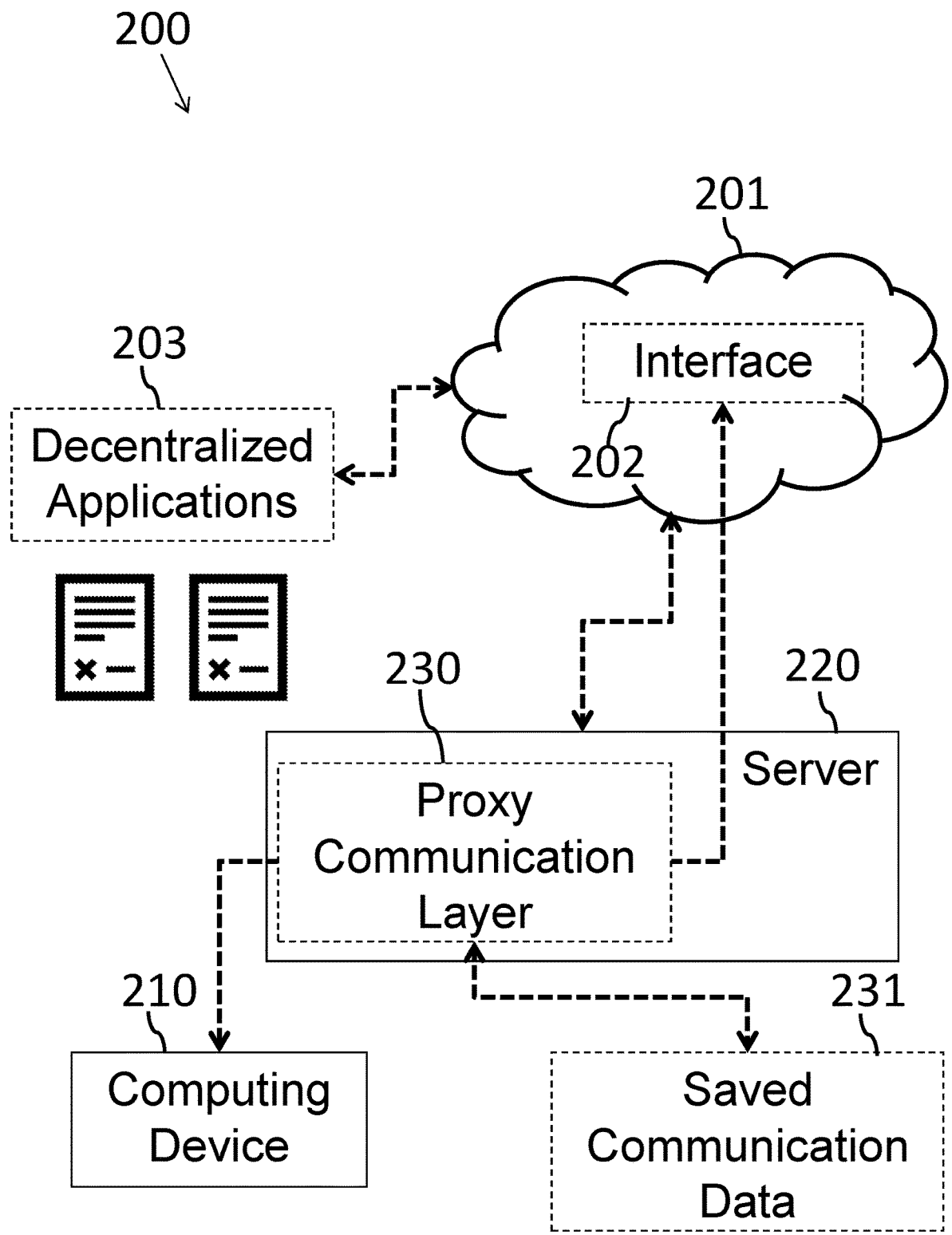

Reference is now made to FIGS. 2A-2B, which shows a block diagram of a system 200 for a secured interface to a blockchain based network 201, according to some embodiments of the invention. In FIG. 2, hardware elements are indicated with a solid line and the direction of arrows indicate a direction of information flow between the hardware elements.

In some embodiments, the system 200 includes an architecture that corresponds to a WEB3 architecture.

The system 200 may include a web interface 202 to, for example, decentralized applications 203 of the blockchain based network 201. For example, the web interface 202 may allow a user of a computing device 210 (e.g., a smartphone and/or any device similar to computing device 100, shown above in FIG. 1) access to the decentralized applications 203 or Dapps.

In some embodiments, the web interface 202 utilizes a dedicated protocol to communicate securely between computing device (e.g., with digital wallets) and Dapps. The protocol may establish a remote connection between a Dapp and a device using a bridge server to relay payloads.

The system 200 may include a server 220. The server 220 may be in communication with the blockchain based network 201 and/or the web interface 202. According to some embodiments, the server 220 is configured to generate a proxy communication layer 230 for mediating communication between the server 220 and the computerized device 210. For example, the proxy communication layer 230 may be added as another layer in the dedicated communication protocol.

The proxy communication layer 230 may parse messages during communication between the server 220 and the computerized device 210. Once the proxy communication layer 230 parses a message from the server 220, the message may be translated into human readable language. The user of the computerized device 210, may receive the translated message and decide what to do (e.g., with a Dapp transaction).

In some embodiments, the proxy communication layer 230 monitors and/or validates if transaction with various Dapps, carried out via the web interface 202, are verified (e.g., verified by all participating parties). Thus, the proxy communication layer 230 may create a reputation value for each Dapp, for instance based on the associated number of validated transactions. In some embodiments, the proxy communication layer 230 blocks communication with Dapps where the number of validated transactions is below a predefined threshold.

In some embodiments, communication between the server 220 and the computerized device 210 is based on a predetermined smart-contract 203 at the blockchain based network 201.

Reference is now made to FIG. 2B, which shows the addition of the proxy communication layer 230.

In some embodiments, the proxy communication layer 230 replaces an IP address 211 of the computerized device 210 with another IP address. For example, the proxy communication layer 230 replaces an IP address 211 of the computerized device 210 with a predefined and/or assigned IP address (e.g., predefined and/or assigned by the server 220). In this manner, by replacing the actual IP address 211 of the computer device 210 with another IP address, the IP address 211 of the user of the computerized device 210 is not exposed or visible to the web interface 202 such that the computerized device 210 may be secured against malicious attacks on the IP address 211 (that is now hidden to others).

According to some embodiments, the server 220 is configured to intercept data communicated through the proxy communication layer 230. For example, the server 220 may identify, via the web interface 202, communication data associated with at least one Dapp, and intercept that communication data. The server may analyze the intercepted communication data in order to identify malicious or unauthorized data.

In some embodiments, communication data intercepted at the proxy communication layer 230 is parsed according to a predetermined smart-contract 203 at the blockchain based network 201. The communication data may then be enriched with additional data and/or analyzed to detect anomalies and/or to detect known malicious behavior.

Thus, the proxy communication layer 230 may protect the sensitive environment of the user's computing device 210, that holds secrets (e.g., private keys but also all other user private data). Such protection may be achieved by moving the security burden to the proxy communication layer 230.

For example, the unauthorized communication data may be determined based on at least one of: protocol syntactic validity (e.g., badly formatted messages, message exceeding size, etc.) and rate of message sending to the computerized device 210.

In some embodiments, the proxy communication layer 230 operates with a plurality of different communication protocols (e.g., the WalletConnect™). Thus, the computerized device 210 may communicate with a plurality of different blockchain based networks via the proxy communication layer 230.

For example, communication between the server 220 and the computerized device 210 is via a web-socket and based on a protocol for secure communication between digital wallets (or cryptographic wallets) and decentralized applications 203.

The server 220 is configured to block unauthorized communication data that is intercepted by the server. Accordingly, the proxy communication layer 230 may in some embodiments operate as an additional security layer to prevent malicious attacks or data leaks in the system 200. In some embodiments, the server 220 blocks unauthorized communication data by stopping all communication requests associated with unauthorized IP addresses.

In some embodiments, unauthorized communication is blocked (e.g., by the server 220) by comparison to at least one of: blacklists, whitelists, custom logic, and the web context through the lifecycle of the communication session.

According to some embodiments, the system 200 also blocks phishing attacks for Dapps, by verifying reputation and/or credentials for particular Dapps via the proxy communication layer 230.

According to some embodiments, the server 220 is configured to maintain communication when the computerized device 210 is offline (e.g., a user using a smartphone for a Dapp that is disconnect when receiving an incoming call) by: saving communication data 231 at the proxy communication layer 230, and transferring the saved communication data 231 to the computerized device 210, when the computerized device 210 is back online.

The system 200 may accordingly secure communication between the computing device 210 and the interface 202 to the blockchain based network 201. For example, the system 200 may be utilized to protect against the BadgerDAO attack with the ERC20 approve.

In the BadgerDAO attack, attackers were able to hack BadgerDAO's web interface to inject a rogue ERC20 token approve( ) request to the potential victims' wallet, that was delivered by the relevant protocol (e.g., WalletConnect™). When the victims agreed to sign with their cryptographic wallet private keys, and send for execution to the blockchain, the attacker was able to take over all their funds in that token. The attackers were able to steal more than $100 M worth of tokens in this manner.

According to some embodiments, the system 200 mitigates this attack. The user connects to the BadgerDAO's Dapp, and a WalletConnect™ connection is generated between the interface 202 and wallet of the computing device 210. The proxy communication layer 230 may examine that request, blocking phishing attempts (e.g., by comparing to blacklists, whitelists and custom logic) and determines the web context through the lifecycle of the communication session. When the buffer that represents the rogue ERC20 token approve( ) request arrives to the proxy communication layer 230 (e.g., received via WalletConnect™), the proxy communication layer 230 may looks up the "to" address against the blockchain based network 201, and/or relevant smart-contracts repository or services, in order to identify this as an ERC20 token and enrich it with the ERC20 name.

The communication data may be parsed, for instance according to the logic of the smart contract to take this raw hexadecimal buffer:

0x395093510000000000000000000000001fcdb04d0-
c5364fbd92c73ca8af9baa7
2c269107ffffffffffffffffffffffffffffffffffffffffffffffffffffffff and derive various parameters, based on the specific smart-contract's code as taken from the blockchain based network and relevant services and auxiliary databases. The derived parameters may include at least one of: function name, spender address, and/or AddedValue as the additional amount the spender is allowed to spend.

Once that the parsing stage had completed the system 200 may apply the security logic, to analyze the spender address parameter, determining it's not associated with a smart-contract code, but it's a "regular" address, which is highly suspicious.

The system 200 may apply the security logic, to analyzing that address history to determine that it only started to serve as a "spender" very recently, compared to the Dapps history (where the Dapp context was obtained in connection stage and remembered along the lifecycle of the session by the proxy communication layer).

Finally, the system 200 may block the communication (or transaction), depending on the user's security settings. In some embodiments, the system 200 blocks and reports to the user, or the enriched transaction is presented to the user, along with a recommendation to block it and the user is able to intelligently decide whether or not they want to sign it and send to blockchain based network.

According to some embodiments, the computing device 210 and the server 230 securely communicate based on the multiple party computation (MPC) protocol, where each partly sends information with a partial share of the cryptographic key.

Reference is now made to FIG. 3, which shows a flowchart for a method of securing interface to a blockchain based network, according to some embodiments of the invention.

In Step 301, a proxy communication layer may be generated (e.g., by a server) for communication between the server and a computerized device. In some embodiments, the proxy communication layer replaces an IP address of the computerized device with another IP address.

In Step 302, data communicated through the proxy communication layer may be intercepted (e.g., by the server).

In Step 303, unauthorized communication data intercepted by the server may be blocked (e.g., by the server). In some embodiments, the server is in communication with the blockchain based network, and where the server provides a web interface to decentralized applications of the blockchain based network.

While certain features of the invention have been illustrated and described herein, many modifications, substitutions, changes, and equivalents may occur to those skilled in the art. It is, therefore, to be understood that the appended claims are intended to cover all such modifications and changes.

Various embodiments have been presented. Each of these embodiments may of course include features from other embodiments presented, and embodiments not specifically described may include various features described herein.

The invention claimed is:

1. A method of securing interface to a blockchain based network, the method comprising:
generating, by a server, a proxy communication layer for communication between the server and a computerized device, wherein the proxy communication layer replaces an IF address of the computerized device with another IP address, and wherein the server provides a web interface to decentralized applications of the blockchain based network;
intercepting, by the server, data communicated through the proxy communication layer;
monitoring, by the server, the intercepted data in order to validate at least one transaction with the decentralized applications, wherein the at least one transaction is carried out via the web interface; and
blocking, by the server, unauthorized communication data intercepted by the server, wherein communication requests associated with unauthorized IP addresses are blocked;
wherein the server is in communication with the blockchain based network.

2. The method of claim 1, wherein the unauthorized communication data is determined based on at least one of: protocol syntactic validity and rate of message sending.

3. The method of claim 1, further comprising parsing the communication data according to a predetermined smart-contract at the blockchain based network.

4. The method of claim 1, wherein the blocking of unauthorized communication is carried out by comparison to blacklists, whitelists, custom logic, and the web context through the lifecycle of the session.

5. The method of claim 1, wherein communication between the server and the computerized device is via a web-socket and based on a protocol for secure communication between wallets and decentralized applications.

6. The method of claim 1, wherein communication between the server and the computerized device is based on a predetermined smart-contract at the blockchain based network.

7. The method of claim 1, further comprising maintaining communication when the computerized device is offline by:
saving communication data at the proxy communication layer; and
transferring the saved data to the computerized device, when the computerized device is back online.

8. A system for secured interface to a blockchain based network, the system comprising:
a web interface to decentralized applications of the blockchain based network; and
a server, in communication with the blockchain based network and the web interface, wherein the server comprises a hardware processor and is configured to:
generate a proxy communication layer for communication between the server and a computerized device, wherein the proxy communication layer replaces an IP address of the computerized device with another IP address;
intercept data communicated through the proxy communication layer;
monitor the intercepted data in order to validate at least one transaction with the decentralized applications, wherein the at least one transaction is carried out via the web interface; and
block unauthorized communication data intercepted by the server.

9. The system of claim 8, wherein the unauthorized communication data is determined based on at least one of: protocol syntactic validity and rate of message sending.

10. The system of claim 8, wherein the communication data is parsed according to a predetermined smart-contract at the blockchain based network.

11. The system of claim 8, wherein unauthorized communication is blocked by comparison to blacklists, whitelists, custom logic, and the web context through the lifecycle of the session.

12. The system of claim 8, wherein communication between the server and the computerized device is via a web-socket and based on a protocol for secure communication between wallets and decentralized applications.

13. The system of claim 8, wherein communication between the server and the computerized device is based on a predetermined smart-contract at the blockchain based network.

14. The system of claim 8, wherein the server is configured to maintain communication when the computerized device is offline by:
saving communication data at the proxy communication layer; and
transferring the saved data to the computerized device, when the computerized device is back online.

15. A method of securing interface to a blockchain based network, the method comprising:
replacing, by a server in communication with the blockchain based network, an IP address of the computerized device with another IP address;
intercepting, by the server, data communicated between the server and a computerized device, wherein the server provides a web interface to decentralized applications of the blockchain based network;
monitoring, by the server the intercepted data in order to validate at least one transaction with the decentralized applications, wherein the at least one transaction is carried out via the web interface; and
blocking, by the server, unauthorized communication data intercepted by the server.

* * * * *